US 11,738,784 B2

United States Patent
Sun et al.

(10) Patent No.: US 11,738,784 B2
(45) Date of Patent: Aug. 29, 2023

(54) LOGIC CONTROL SYSTEM FOR MAGNETIC TRACK BRAKING OF RAIL TRANSIT VEHICLE

(71) Applicant: CRRC Nanjing Puzhen Co., Ltd., Nanjing (CN)

(72) Inventors: Jian Sun, Nanjing (CN); Qian Zhang, Nanjing (CN); Xun Mao, Nanjing (CN); Dejian Song, Nanjing (CN); Fei Xiao, Nanjing (CN); Hongquan Xue, Nanjing (CN); Hongfei Zhang, Nanjing (CN); Kai Yu, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 493 days.

(21) Appl. No.: 17/047,395

(22) PCT Filed: Dec. 5, 2019

(86) PCT No.: PCT/CN2019/123203
§ 371 (c)(1),
(2) Date: Oct. 14, 2020

(87) PCT Pub. No.: WO2021/082176
PCT Pub. Date: May 6, 2021

(65) Prior Publication Data
US 2023/0125517 A1    Apr. 27, 2023

(30) Foreign Application Priority Data
Oct. 28, 2019    (CN) .......................... 201911027980.3

(51) Int. Cl.
*H01H 47/00*    (2006.01)
*B61H 13/00*    (2006.01)
(Continued)

(52) U.S. Cl.
CPC ............ *B61H 13/00* (2013.01); *B60T 13/748* (2013.01); *B61H 7/08* (2013.01); *H01F 7/064* (2013.01)

(58) Field of Classification Search
None
See application file for complete search history.

(56) References Cited

U.S. PATENT DOCUMENTS 4,359,247 A * 11/1982 Miller ....................... B61H 7/04
                                                                188/41
2009/0288920 A1* 11/2009 Kattainen ................. B66B 1/32
                                                                187/287
(Continued)

FOREIGN PATENT DOCUMENTS

CN    103747997 A    4/2014
CN    104411563 A    3/2015
(Continued)

*Primary Examiner* — Stephen W Jackson
(74) *Attorney, Agent, or Firm* — Bayramoglu Law Offices LLC

(57) ABSTRACT

A logic control system for magnetic track braking of a rail transit vehicle includes a magnetic track braking control circuit, a magnetic track braking power supply execution circuit, and a magnetic track braking status monitoring and feedback circuit. The magnetic track braking control circuit includes a pneumatic actuator relay, an electromagnet relay, a system protection relay, a power-on delay relay, a power-off delay relay, an automatic control branch circuit, and a manual control branch circuit. The pneumatic actuator relay is connected to the power-on delay relay, and the system protection relay is connected to the power-off delay relay. The automatic control branch circuit includes a first isolation magnetic track braking switch and an emergency braking relay contact. The manual control branch circuit includes a (Continued)

first circuit breaker, a cab signal option switch, a second isolation magnetic track braking switch and a manual touch button.

10 Claims, 2 Drawing Sheets

(51) Int. Cl.
  *H01F 7/06*    (2006.01)
  *B60T 13/74*   (2006.01)
  *B61H 7/08*    (2006.01)

(56) References Cited

U.S. PATENT DOCUMENTS

| | | | |
|---|---|---|---|
| 2014/0190512 A1* | 7/2014 | Elstorpff | B60T 1/04 |
| | | | 134/1 |
| 2014/0303817 A1* | 10/2014 | Mayer | B60T 17/228 |
| | | | 701/19 |
| 2015/0130267 A1* | 5/2015 | Rasel | B60T 13/665 |
| | | | 303/57 |

FOREIGN PATENT DOCUMENTS

| | | |
|---|---|---|
| CN | 106394598 A | 2/2017 |
| CN | 106671960 A | 5/2017 |
| CN | 107867280 A | 4/2018 |
| DE | 3738955 A1 | 5/1989 |
| KR | 20120032719 A | 4/2012 |

* cited by examiner

LOGIC CONTROL SYSTEM FOR MAGNETIC TRACK BRAKING OF RAIL TRANSIT VEHICLE

CROSS REFERENCE TO THE RELATED APPLICATIONS

This application is the national phase entry of International Application No. PCT/CN2019/123203, filed on Dec. 5, 2019, which is based upon and claims priority to Chinese Patent Application No. 201911027980.3, filed on Oct. 28, 2019, the entire contents of which are incorporated herein by reference.

TECHNICAL FIELD

The present invention relates to the technical field of rail transit vehicle control circuits, in particular, a logic control system for magnetic track braking of a rail transit vehicle.

BACKGROUND

Magnetic track braking is mainly used as an auxiliary braking method for emergency braking of high-speed passenger trains with insufficient adhesion. When the magnetic braking is activated, the adhesion factor between the wheel and the rail is significantly increased due to the electromagnet's grinding effect on the rail. A train that adopts magnetic track braking can increase its speed by 40 km/h more than those that do not use the magnetic track braking and shorten its braking distance.

Currently, the magnetic track braking of rail transit vehicles mainly includes high-suspension magnetic track braking and low-suspension magnetic track braking according to the suspension mode. The major differences of the two magnetic track braking methods lies in the distance between the retracted magnetic track braking actuator and the track. The high-suspension magnetic track braking is generally used for high-speed trains with a speed of 120 km/h or higher. During the operation of the high-speed train, if the magnet is suspended excessively and lowly, it becomes venerable to foreign objects, which potentially can break the magnet and create a very dangerous situation. The low-suspension magnetic track braking is used for urban trams, subway trains, and light rail trains, all with a speed of 120 km/h or lower. The present invention is only aimed at high-suspension magnetic track braking, which has a wide range of application prospects in the future.

At present, the magnetic track braking system of conventional urban rail vehicles uses DC24V power supply. The system only uses a contactor to control the closing and disconnection of the magnetic track braking coil to apply the magnetic track braking, which is not suitable for the DC110V power supply system of the newly developed medium and high-speed urban rail vehicles. Under the DC24V power supply system, the new vehicle cannot directly perform delay control on the magnetic track braking actuator, the excitation device, and other devices. In addition, the new functions of automatic power-off after extensive operating time, status monitoring and indication, and fault feedback of the magnetic track system that are required by the new vehicle do not have any current application.

SUMMARY

In order to solve the above problems identified in the prior art, an objective of the present invention is to provide a logic control system for magnetic track braking of a rail transit vehicle.

In order to solve the above technical problems, the present invention provides a logic control system for magnetic track braking of a rail transit vehicle that includes a magnetic track braking control circuit, a magnetic track braking power supply execution circuit, and a magnetic track braking status monitoring and feedback circuit. The magnetic track braking control circuit includes a pneumatic actuator relay K4, an electromagnet relay K3, a system protection relay K5, a power-on delay relay DRM1, and a power-off delay relay DRM2. The pneumatic actuator relay K4 is connected to the power-on delay relay DRM1, and the system protection relay K5 is connected to the power-off delay relay DRM2. The control circuit includes an automatic control branch circuit and a manual control branch circuit. The automatic control branch circuit includes an isolation magnetic track braking switch MTBBS and an emergency braking relay contact K2. The isolation magnetic track braking switch MTBBS and the emergency braking relay contact K2 are connected in series to receive a speed signal. The manual control branch circuit includes a first circuit breaker CB1, a cab signal option switch COR, an isolation magnetic track braking switch MTBBS, and a manual touch button MTBPB. The first circuit breaker CB1, the cab signal option switch COR, the isolation magnetic track braking switch MTBBS, and the manual touch button MTBPB are successively connected in series with a train power supply. The automatic control branch circuit and the manual control branch circuit are connected to a network command switch K0, which is controlled by a network command of a train control and management system (TCMS), and a normally open contact of the system protection relay K5, successively, and then the automatic control branch circuit and the manual control branch circuit are connected to the pneumatic actuator relay K4 and the power-on delay relay DRM1. The power-off delay relay DRM2 is connected to a normally closed contact of the electromagnet relay K3 and the first circuit breaker CB1, successively, and then connected to the train power supply.

The magnetic track braking control circuit may be automatically controlled by setting a speed signal of the vehicle, or manually controlled by a manual button. The present invention performs the following functions: the magnetic track braking actuator (the pneumatic actuator control device) and the electromagnet are subject to time-sharing control; the electromagnet is automatically powered off after being excited for 5 min, thereby preventing the electromagnet from being damaged due to extensive operating time; and the magnetic track braking system is automatically cut off when the vehicle power supply fails. The present invention can be used to all medium and high-speed urban rail vehicles according to the application requirements of specific scenarios and can safely and reliably control the magnetic track braking system.

DETAILED DESCRIPTION OF THE EMBODIMENTS

The embodiments of the present invention are explained in conjunction with the drawings.

An embodiment of the present invention provides a logic control system for magnetic track braking of a rail transit vehicle that is suitable for a high-suspension magnetic track braking device. The high-suspension magnetic track braking device includes a structural support, a cylinder, and an electromagnet. The cylinder and the electromagnet are provided on the structural support. The cylinder (pneumatic actuator) is controlled by a pneumatic actuator control device to drive the structural support of the cylinder up and down. The application of high-suspension magnetic track braking is divided into two stages. In a first stage, a magnetic track braking actuator drops to a set position. In a second stage, a magnetic track is excited, and then generates an electromagnetic attraction force with a guide rail to produce friction. In the present invention, the magnetic track braking logic control circuit includes a magnetic track braking control circuit (see FIG. 1), a magnetic track braking power supply execution circuit (see FIG. 2), and a magnetic track braking status monitoring and feedback circuit (see FIG. 3).

Figure 1:
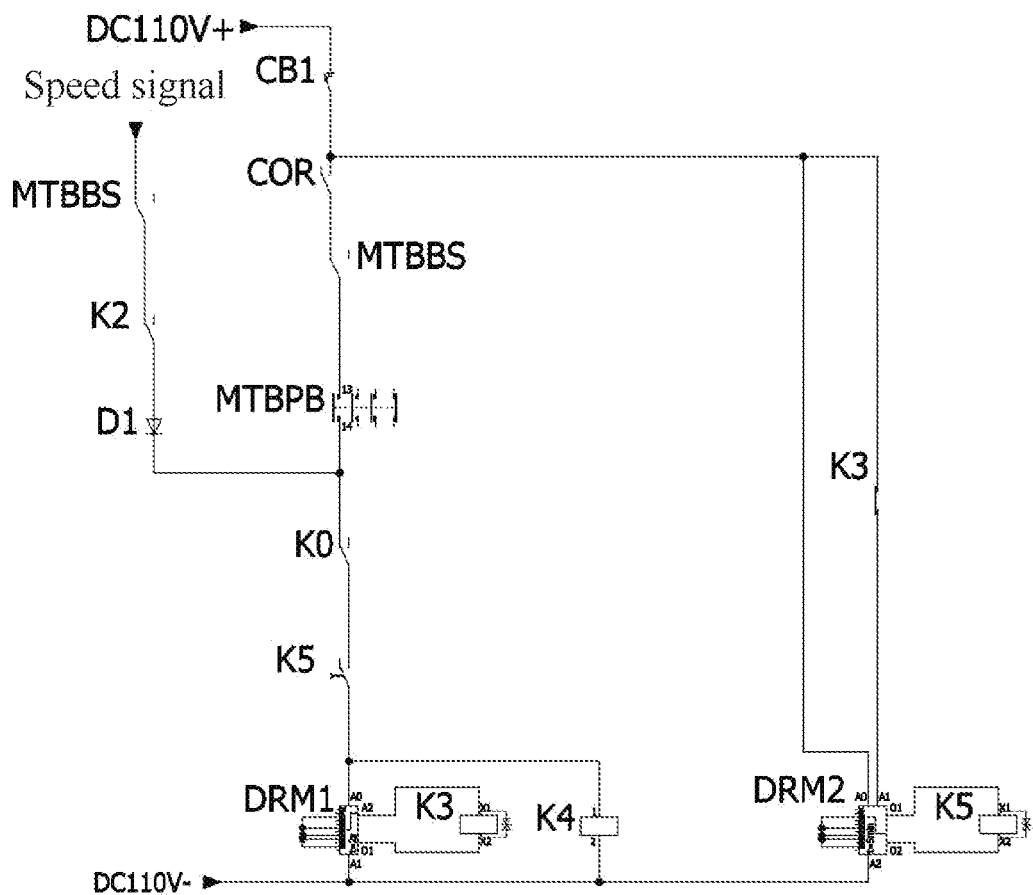
FIG. 1 is a schematic diagram showing a magnetic track braking control circuit according to the present invention.

As shown in FIG. 1, the magnetic track braking control circuit includes the pneumatic actuator relay K4, the electromagnet relay K3, the system protection relay K5, the power-on delay relay DRM1 (with a 2 s delay), and the power-off delay relay DRM2 (with a 5 min delay). The pneumatic actuator relay K4 is connected to the power-on delay relay DRM1. The system protection relay K5 is connected to the power-off delay relay DRM2. The control circuit includes an automatic control branch circuit and a manual control branch circuit. The automatic control branch circuit includes the isolation magnetic track braking switch MTBBS and the emergency braking relay contact K2, which are connected in series to receive a speed signal. The manual control branch circuit includes the first circuit breaker CB1, the cab signal option switch COR, the isolation magnetic track braking switch MTBBS, and the manual touch button MTBPB, that are all successively connected in series with a train power supply. The automatic control branch circuit and the manual control branch circuit are connected to the network command switch K0, which is controlled by a network command of a train control and management system (TCMS), and a normally open contact of the system protection relay K5 successively, and then the automatic control branch circuit and the manual control branch circuit are connected to the pneumatic actuator relay K4 and the power-on delay relay DRM1. The power-off delay relay DRM2 is connected to a normally closed contact of the electromagnet relay K3 and the first circuit breaker CB1, successively, and then connected to the train power supply. The diode D1 is connected in series with the automatic control branch circuit and conducts forward to protect the circuit from reverse current impact.

The pneumatic actuator relay K4 is configured to control the pneumatic actuator of the magnetic track braking device. The pneumatic actuator relay K4 is powered on to drive the pneumatic actuator of the magnetic track braking device to move down to a set position to cause the electromagnet provided on the structural support to approach the track. When the emergency braking relay contact K2 is closed, it indicates that an emergency braking is applied, and when the emergency braking relay contact K2 is disconnected, it indicates that the emergency braking is not applied. When the isolation magnetic track braking switch MTBBS is turned off, the magnetic track braking does not start. When the vehicle does not give a power supply failure signal, the network command switch K0 is turned on, otherwise the network command switch K0 is turned off. When the cab signal option switch COR is turned on, the magnetic track braking can only be manually controlled by a corresponding cab. The magnetic track braking is triggered when the manual touch button MTBPB is closed, and the magnetic track braking is relieved when the manual touch button MTBPB is disconnected. When the electromagnet relay K3 is powered on, the electromagnet is powered on, otherwise the electromagnet is powered off.

The magnetic track braking control circuit may be automatically controlled by setting a speed signal of the vehicle, or manually controlled by a manual button. The magnetic track braking actuator (the pneumatic actuator control device) and the electromagnet are subject to time-sharing control. The electromagnet is automatically powered off after being excited for 5 min, thereby preventing the electromagnet from being damaged due to extensive operating time. The magnetic track braking system is automatically cut off when the vehicle power supply fails.

Figure 2:
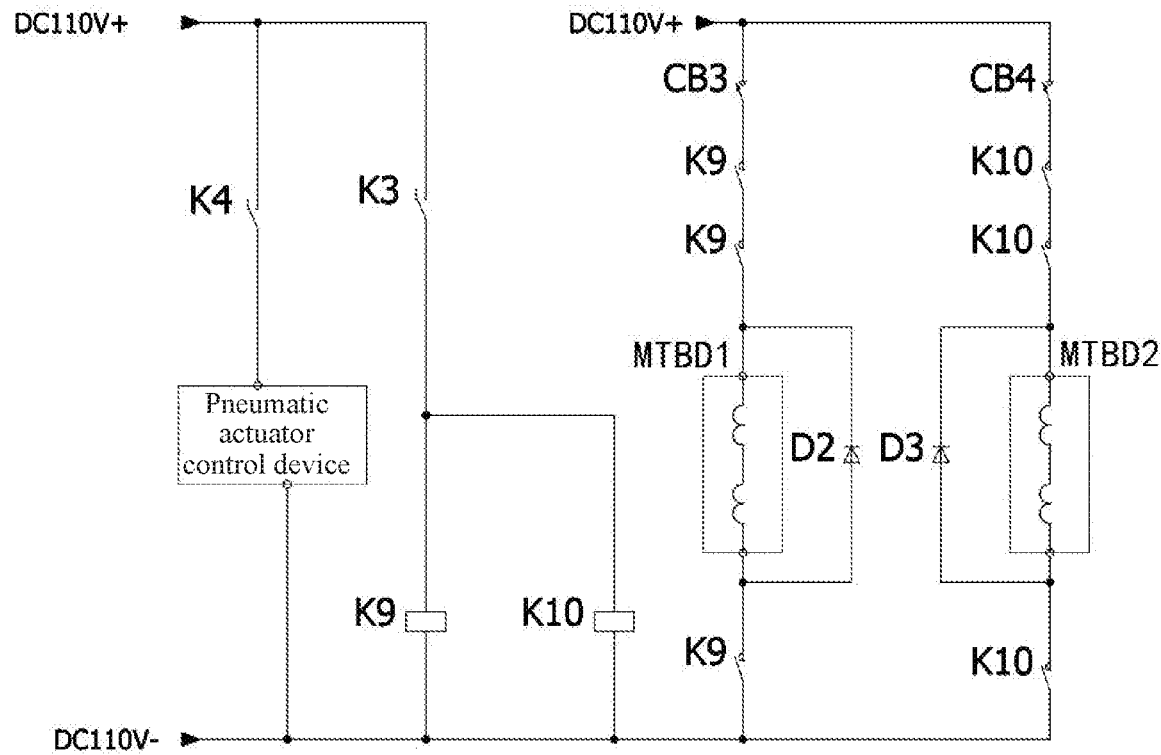
FIG. 2 is a schematic diagram showing a magnetic track braking power supply execution circuit according to the present invention.

As shown in FIG. 2, the magnetic track braking power supply execution circuit includes a pneumatic actuator control device, the bogie first electromagnet contactor K9, the bogie second electromagnet contactor K10, the bogie first electromagnet MTBD1, and the bogie second electromagnet MTBD2. The pneumatic actuator control device is connected in series with a normally open contact of the pneumatic actuator relay K4 and then connected to the train power supply. The bogie first electromagnet contactor K9 and the bogie second electromagnet contactor K10 are connected in parallel, then connected in series with a normally open contact of the electromagnet relay K3 and connected to the train power supply. The bogie first electromagnet MTBD1 is connected in series with a normally open contact of the bogie first electromagnet contactor K9, and then connected to the train power supply. The bogie second electromagnet MTBD2 is connected in series with a normally open contact of the bogie second electromagnet contactor K10, and then connected to the train power supply. The third circuit breaker CB3 is connected in series with a power supply circuit of the bogie first electromagnet MTBD1. The fourth circuit breaker CB4 is connected in series with a power supply circuit of the bogie second electromagnet MTBD2. The first freewheeling diode D2 is connected in parallel at both ends of the bogie first electromagnet MTBD1. The second freewheeling diode D3 is connected in parallel at both ends of the bogie second electromagnet MTBD2.

The magnetic track braking power supply execution circuit can realize the functions of the action control of the magnetic track braking actuator, the excitation control of the electromagnet and the electromagnet coil power failure reverse DC800V impulse voltage protection.

A normally closed contact of the bogie first electromagnet contactor K9 and/or a normally closed contact of the bogie second electromagnet contactor K10, instead of the normally closed contact of the electromagnet relay K3, are connected in series with a power supply circuit of the power-off delay relay DRM2.

Figure 3:
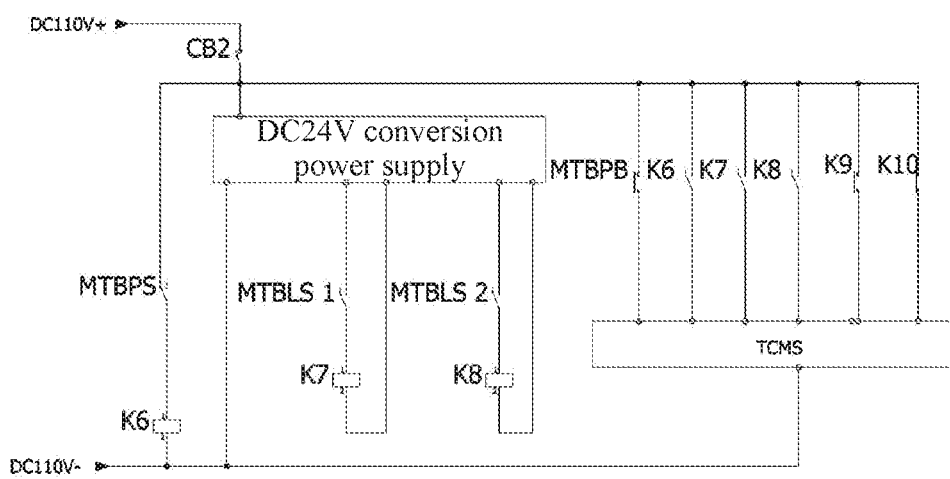
FIG. 3 is a schematic diagram showing a magnetic track braking status monitoring and feedback circuit according to the present invention.

As shown in FIG. 3, the magnetic track braking status monitoring and feedback circuit includes the magnetic track braking pneumatic switch MTBPS, the magnetic track braking pneumatic switch status acquisition relay K6, the conversion power supply, the bogie first magnetic track braking limiting switch MTBLS1, the bogie second magnetic track braking limiting switch MTBLS2, the bogie first magnetic track braking limiting switch status acquisition relay K7, and the bogie second magnetic track braking limiting switch status acquisition relay K8. The magnetic track braking pneumatic switch MTBPS is connected in series with the magnetic track braking pneumatic switch status acquisition relay K6, and then connected to the train power supply. The conversion power supply is connected to the train power supply. The bogie first magnetic track braking limiting switch MTBLS1 is connected in series with the bogie first magnetic track braking limiting switch status acquisition relay K7 and then connected to the conversion power supply. The bogie second magnetic track braking limiting switch MTBLS2 is connected in series with the bogie second magnetic track braking limiting switch status acquisition relay K8 and then connected to the conversion power supply. The TCMS of the vehicle monitors statuses of the manual touch button MTBPB, the magnetic track braking pneumatic switch status acquisition relay K6, the bogie first magnetic track braking limiting switch status acquisition relay K7, the bogie second magnetic track braking limiting switch status acquisition relay K8, the bogie first electromagnet contactor K9 and the bogie second electromagnet contactor K10. The magnetic track braking status monitoring and feedback circuit further includes the second circuit breaker CB2. The second circuit breaker CB2 is simultaneously connected to a power supply circuit of the magnetic track braking pneumatic switch MTBPS and a power supply circuit of the conversion power supply.

The magnetic track braking status monitoring and feedback circuit can monitor the statuses in real-time, such as determining the pressure of the magnetic track braking cylinder, whether the action of the magnetic track braking actuator is in place and whether the magnetic track braking is applied, and can be used to acquire the information of the relays by the network for fault determination and alarm.

1. System Preparation and Description

Four circuit protection breakers, namely the first circuit breaker CB1, the second circuit breaker CB2, the third circuit breaker CB3 and the fourth circuit breaker CB4, are turned on.

The isolation magnetic track braking switch MTBBS is not in an "isolation" position.

When the emergency braking relay contact K2 is closed, it indicates that an emergency braking is applied, and when the emergency braking relay contact K2 is disconnected, it indicates that the emergency braking is not applied.

When a local cab option relay COR is powered on, the magnetic track braking can only be manually controlled in a main control cab.

TCMS network command: At this time, if the vehicle does not send a power supply failure signal, the circuit is closed; if there is a power supply failure in the vehicle system, the circuit is disconnected, and the magnetic track braking cannot be applied.

The normally closed contact of the electromagnet relay K3 is located at an upper end of the power-off delay relay DRM2, and the power-off delay relay DRM2 is in a normally powered-on status. When a coil of the electromagnet relay K3 is powered on, the normally closed contact of the electromagnet relay K3 at the upper end of the power-off delay relay DRM2 is disconnected. The power-off delay relay disconnects a coil of the system protection relay K5 after a delay of 5 min. The normally open contact of the system protection relay K5 at an upper end of the power-on delay relay DRM1 changes from the turn-on status to the turn-off status to relieve the magnetic track braking.

2. Automatic Control and Manual Control

In automatic control, the magnetic track braking is triggered under the conditions that a speed signal (which may be set according to the specific vehicle) is sent and the vehicle applies the emergency braking (the emergency braking relay contact K2 is closed). The magnetic track braking is not applied if any condition is not met.

In manual control, the magnetic track braking is triggered and relieved by operating the manual touch button MTBPB.

3. Description of Magnetic Track Braking Control

A coil of the pneumatic actuator relay K4 is immediately powered on through either automatic or manual control. As shown in FIG. 2, a normally open contact of the pneumatic actuator relay K4 is closed to drive the pneumatic actuator for the magnetic track braking to move down to a set position. The position is set according to a height of the vehicle, and the position information is acquired through a limiting switch).

The power-on delay relay DRM1 is powered on through automatic and manual control, and the power-on delay relay DRM1 after a delay of 2 s drives the coil of the electromagnet relay K3. As shown in FIG. 2, the normally open contact of the electromagnet relay K3 is closed to drive coils of the bogie first electromagnet contactor K9 and the bogie second electromagnet contactor K10. In this way, the normally open contact of the corresponding contactor at the upper end of the electromagnet is closed, and the electromagnet is excited to generate an attraction force with the guide rail, and the magnetic track braking is applied through a contact friction force.

4. Magnetic Track Braking Status Monitoring

As shown in FIG. 3, the TCMS, namely the network system, monitors statuses of the manual touch button MTBPB, the magnetic track braking pneumatic switch status acquisition relay K6, the bogie first magnetic track braking limiting switch status acquisition relay K7, the bogie second magnetic track braking limiting switch status acquisition relay K8, the bogie first electromagnet contactor K9, and the bogie second electromagnet contactor K10.

Monitoring the status of the manual touch button MTBPB (normally open): the number of manual control of the magnetic track braking is recorded.

Monitoring the status of the magnetic track braking pneumatic switch status acquisition relay K6: when the pressure of the cylinder is excessively low, the normally closed contact of the magnetic track braking pneumatic switch MTPBS acts. The network monitors the status of the contact of the magnetic track braking pneumatic switch status acquisition relay K6 to determine whether the pressure of the cylinder meets the requirements.

Monitoring the statuses of the bogie first magnetic track braking limiting switch status acquisition relay K7 and the bogie second magnetic track braking limiting switch status acquisition relay K8: when the bogie first magnetic track braking limiting switch MTBLS1 and the bogie second magnetic track braking limiting switch MTBLS2 act in place, their normally open contacts are closed. The network monitors the status of the contact of the bogie first magnetic track braking limiting switch status acquisition relay K7 and the status of the contact of the bogie second magnetic track braking limiting switch status acquisition relay K8 to determine whether the pneumatic actuator is in place.

Monitoring the statuses of the bogie first electromagnet contactor K9 and the bogie second electromagnet contactor K10: when coil contacts of the first electromagnet contactor K9 and the bogie second electromagnet contactor K10 are closed, it indicates that the electromagnet is excited.

5. Logical Determination of TCMS (Network System), which is Implemented Through TCMS Software Program If the TCMS monitors that the contact of the magnetic track braking pneumatic switch status acquisition relay K6 is powered off, it needs to report a fault—the magnetic track braking air pressure is insufficient.

If the TCMS monitors that the statuses of the first magnetic track braking limiting switch status acquisition relay K7 and the bogie second magnetic track braking limiting switch status acquisition relay K8 are inconsistent, it needs to report a fault—the first magnetic track braking limiting switch status acquisition relay K7 or the bogie second magnetic track braking limiting switch status acquisition relay K8 or the magnetic track braking actuator or a limiting switch fails (Note: If the fault point cannot be located, troubleshooting should be conducted one by one).

If the TCMS monitors that the statuses of the bogie first electromagnet contactor K9 and the bogie second electromagnet contactor K10 are inconsistent, it needs to report a fault—the bogie first electromagnet contactor K9 or the bogie second electromagnet contactor K10 fails.

If K6, K7, K8, K9 and K10 are powered on at the same time, the TCMS reports that the magnetic track braking is applied.

If the TCMS detects any failure, the network command switch K0 needs to be cut off.

The present invention may have other embodiments in addition to those embodiments described above. Any technical solution formed by equivalent replacements or equivalent transformations based on the present invention should shall fall within the scope of protection of the present invention.

What is claimed is:

1. A logic control system for a magnetic track braking of a rail transit vehicle, comprising:
    a magnetic track braking control circuit;
    a magnetic track braking power supply execution circuit; and
    a magnetic track braking status monitoring and feedback circuit;
    wherein the magnetic track braking control circuit comprises a pneumatic actuator relay, an electromagnet relay, a system protection relay, a power-on delay relay, a power-off delay relay, an automatic control branch circuit, and a manual control branch circuit;
    wherein the pneumatic actuator relay is connected to the power-on delay relay, and the system protection relay is connected to the power-off delay relay;
    wherein the automatic control branch circuit comprises a first isolation magnetic track braking switch and an emergency braking relay contact, wherein the first isolation magnetic track braking switch and the emergency braking relay contact are connected in series to receive a speed signal;
    wherein the manual control branch circuit comprises a first circuit breaker, a cab signal option switch, a second isolation magnetic track braking switch and a manual touch button, wherein the first circuit breaker, the cab signal option switch, the second isolation magnetic track braking switch and the manual touch button are successively connected in series with a train power supply;
    wherein the automatic control branch circuit and the manual control branch circuit are connected to a network command switch and a normally open contact of the system protection relay successively, and then the automatic control branch circuit and the manual control branch circuit are connected to the pneumatic actuator relay and the power-on delay relay; the network command switch is controlled by a network command of a train control and management system (TCMS); the power-off delay relay is connected to a normally closed contact of the electromagnet relay and the first circuit breaker successively, and then the power-off delay relay is connected to the train power supply.

2. The logic control system according to claim 1, wherein a diode is connected in series with the automatic control branch circuit.

3. The logic control system according to claim 1, wherein the pneumatic actuator relay is configured to control a pneumatic actuator of a magnetic track braking device; wherein the pneumatic actuator relay is powered on to drive the pneumatic actuator of the magnetic track braking device to move down to a set position to cause an electromagnet provided on a structural support to approach a track.

4. The logic control system according to claim 1, wherein an emergency braking is applied when the emergency braking relay contact is closed, and the emergency braking is not applied when the emergency braking relay contact is disconnected; wherein the magnetic track braking does not start when the first isolation magnetic track braking switch or the second isolation magnetic track braking switch is turned off; the network command switch is turned on when the rail transit vehicle does not give a power supply failure signal, and the network command switch is turned off when the rail transit vehicle gives the power supply failure signal; the magnetic track braking is only manually controlled by a cab corresponding to the cab signal option switch when the cab signal option switch is turned on; the magnetic track braking is triggered when the manual touch button is closed, and the magnetic track braking is relieved when the manual touch button is disconnected; an electromagnet is powered on when the electromagnet relay is powered on, and the electromagnet is powered off when the electromagnet relay is powered off.

5. The logic control system according to claim 1, wherein the magnetic track braking power supply execution circuit comprises a pneumatic actuator control device, a bogie first electromagnet contactor, a bogie second electromagnet contactor, a bogie first electromagnet, and a bogie second electromagnet; wherein
    the pneumatic actuator control device is connected in series with a normally open contact of the pneumatic actuator relay and then the pneumatic actuator control device is connected to the train power supply;
    the bogie first electromagnet contactor and the bogie second electromagnet contactor are connected in parallel, the bogie first electromagnet contactor and the bogie second electromagnet contactor are first connected in series with a normally open contact of the electromagnet relay and then the bogie first electromagnet contactor and the bogie second electromagnet contactor are connected to the train power supply;
    the bogie first electromagnet is connected in series with a normally open contact of the bogie first electromagnet contactor, and then the bogie first electromagnet is connected to the train power supply; and
    the bogie second electromagnet is connected in series with a normally open contact of the bogie second electromagnet contactor, and then the bogie second electromagnet is connected to the train power supply.

6. The logic control system according to claim 5, wherein a third circuit breaker is connected in series with a power supply circuit of the bogie first electromagnet; a fourth circuit breaker is connected in series with a power supply circuit of the bogie second electromagnet.

7. The logic control system according to claim 5, wherein a normally closed contact of the bogie first electromagnet contactor and/or a normally closed contact of the bogie second electromagnet contactor, instead of the normally closed contact of the electromagnet relay, is connected in series with a power supply circuit of the power-off delay relay.

8. The logic control system according to claim 5, wherein a first freewheeling diode-Da is connected in parallel at both ends of the bogie first electromagnet; a second freewheeling diode is connected in parallel at both ends of the bogie second electromagnet.

9. The logic control system according to claim 5, wherein the magnetic track braking status monitoring and feedback circuit comprises a magnetic track braking pneumatic switch, a magnetic track braking pneumatic switch status acquisition relay, a conversion power supply, a bogie first magnetic track braking limiting switch, a bogie second magnetic track braking limiting switch, a bogie first magnetic track braking limiting switch status acquisition relay, and a bogie second magnetic track braking limiting switch status acquisition relay; wherein the magnetic track braking pneumatic switch is connected in series with the magnetic track braking pneumatic switch status acquisition relay and then the magnetic track braking pneumatic switch is connected to the train power supply;

the conversion power supply is connected to the train power supply;

the bogie first magnetic truck braking limiting switch is connected in series with the bogie first magnetic track braking limiting switch status acquisition relay and then the bogie first magnetic track braking limiting switch is connected to the conversion power supply;

the bogie second magnetic track braking limiting switch is connected in series with the bogie second magnetic track braking limiting switch status acquisition relay and then the bogie second magnetic track braking limiting switch is connected to the conversion power supply; and the TCMS of the rail transit vehicle monitors statuses of the manual touch button, the magnetic track braking pneumatic switch status acquisition relay, the bogie first magnetic track braking limiting switch status acquisition relay, the bogie second magnetic track braking limiting switch status acquisition relay, the bogie first electromagnet contactor and the bogie second electromagnet contactor.

10. The logic control system according to claim 9, wherein the magnetic track braking status monitoring and feedback circuit further comprises a second circuit breaker; the second circuit breaker is simultaneously connected to a power supply circuit of the magnetic track braking pneumatic switch and a power supply circuit of the conversion power supply.

* * * * *